(12) United States Patent
Wang (10) Patent No.: US 12,037,806 B2
(45) Date of Patent: Jul. 16, 2024

(54) THREE-FOLDING INFLATABLE CAR ROOF TENT AND STORAGE DEVICE THEREOF

(71) Applicant: Jinlong Wang, Beijing (CN)

(72) Inventor: Jinlong Wang, Beijing (CN)

(73) Assignee: Beijing Playdo Outdoor Product Co., Ltd., Beijing (CN)

(*) Notice: Subject to any disclaimer, the term of this patent is extended or adjusted under 35 U.S.C. 154(b) by 287 days.

(21) Appl. No.: 17/716,953

(22) Filed: Apr. 8, 2022

(65) Prior Publication Data

US 2023/0323698 A1  Oct. 12, 2023

(51) Int. Cl.
| | |
|---|---|
| *E04H 15/06* | (2006.01) |
| *B60P 3/39* | (2006.01) |
| *B60R 3/02* | (2006.01) |
| *E04H 15/20* | (2006.01) |
| *E04H 15/56* | (2006.01) |

(52) U.S. Cl.
CPC ............... *E04H 15/06* (2013.01); *B60P 3/39* (2013.01); *B60R 3/02* (2013.01); *E04H 15/20* (2013.01); *E04H 15/56* (2013.01); *E04H 2015/201* (2013.01)

(58) Field of Classification Search
CPC ........ E04H 15/06; E04H 15/008; E04H 15/20
See application file for complete search history.

(56) References Cited

U.S. PATENT DOCUMENTS

| | | | | |
|---|---|---|---|---|
| 2,533,683 | A * | 12/1950 | Neuhaus | E04H 15/06 135/96 |
| 3,009,471 | A * | 11/1961 | Rossiter | B60P 3/38 135/132 |
| 3,506,299 | A * | 4/1970 | Arnold | B60P 3/341 296/170 |
| 4,223,689 | A * | 9/1980 | Cox | B60P 3/38 135/904 |
| 10,208,502 | B2 * | 2/2019 | Currid | E04H 15/06 |
| 10,316,541 | B2 * | 6/2019 | Attema | E04H 15/06 |
| 10,890,010 | B1 | 1/2021 | Chang et al. | |
| 10,920,445 | B2 * | 2/2021 | Montesalvo | E04H 15/06 |
| 11,028,613 | B2 * | 6/2021 | Harrison | E04H 15/20 |
| 11,299,905 | B2 * | 4/2022 | Brensinger | E04H 15/06 |
| 2019/0225135 | A1 * | 7/2019 | Dorn | B60P 3/341 |
| 2020/0224446 | A1 | 7/2020 | Park | |
| 2022/0098893 | A1 * | 3/2022 | Chen | B60P 3/341 |

FOREIGN PATENT DOCUMENTS

| | | |
|---|---|---|
| CN | 111719933 A | 9/2020 |
| CN | 215331862 U | 12/2021 |

\* cited by examiner

*Primary Examiner* — Noah Chandler Hawk (57) ABSTRACT

The present invention provides a three-folding inflatable car roof tent and a storage device thereof. The three-folding inflatable car roof tent includes a tent main body, composite slide rails, a three-folding bed frame and the a storage device; the three-folding bed frame is fixedly installed above a base frame; the tent main body is detachably fixed on the three-folding bed frame; the storage device is of a shell structure that is telescopically adjusted in size; the lower side border of the storage device is in sliding connection with the border of the base frame; and the three-folding bed frame may be stored by the sliding storage device after being folded. The three-folding inflatable car roof tent is relatively light in overall weight, firm in structure and convenient to support and store.

11 Claims, 11 Drawing Sheets

THREE-FOLDING INFLATABLE CAR ROOF TENT AND STORAGE DEVICE THEREOF

FIELD OF TECHNOLOGY

The present invention relates to the field of car roof tent equipment, in particular to a three-folding inflatable car roof tent and a storage device thereof.

BACKGROUND

More and more people choose to drive to the wild to get close to nature. Many people like to camp and set up tents on car roofs to provide themselves a comfortable place to rest. Existing car roof tents have relatively small outer covers for accommodating the tents, and the sizes that may accommodate the tents are also limited, resulting in limited use spaces of the tents and relatively poor user experience. In addition, rigid structures of some tents are relatively heavy, resulting in relatively large loads of cars, high requirements for the bearing capacities of the roofs, laborious installation by the users and poor user experience.

SUMMARY

The purpose of the present invention is to provide a three-folding inflatable car roof tent and a storage device thereof. The car roof tent that is large in use space, small in size after being folded and light in weight and the telescopic storage device thereof are realized. The car roof tent is convenient to store.

In order to achieve the purpose, the present invention provides the following technical scheme:

A three-folding inflatable car roof tent and a storage device thereof, including the tent and the storage device; the tent is capable of being stored in the storage device; the storage device comprises: a shell, wherein an open bottom is formed in a lower portion of the shell, and the interior of the shell is of a hollow structure; and two rows of composite slide rails, wherein each of the two rows of composite slide rails includes a first connecting frame, and two first connecting frames are respectively connected to two symmetric bottom sides of the shell.

Further, the tent comprises a tent main body and an inflatable support frame, and further comprises: a three-folding bed frame, fixedly connected with the upper portions of side frames of the composite slide rails, and being capable of sliding into the hollow shell through the composite slide rails.

Further, each row of the composite slide rails comprises: first slide ways, respectively arranged on two sides of a lower portion of the three-folding bed frame; a second slide way, arranged on an outer side of the corresponding first slide way and fixedly connected with the corresponding first slide way; double-row roller wheels, fixedly connected with a first connecting frame, arranged in the first slide ways and being capable of sliding relative to the corresponding first slide ways, wherein each of the first connecting frames further comprises a slide rail slide way, and a slide rail of the slide rail slide way is arranged in the second slide way and is slidable relative to the corresponding second slide way; single-row roller wheels, arranged in a slide way of the slide rail slide way, and being capable of sliding relative to the slide rail slide way; and a second connecting frame, fixedly connected with the single-row roller wheels.

Further, the shell comprises: a middle shell, fixedly connected with two second connecting frames; a rear shell, fixedly connected with two first connecting frames, and being capable of being sleeved with the middle shell through slide-in of the composite slide rails; and a front shell, having one side edge hinged to an outer edge of the middle shell, and being capable of being turned outwards and upwards relative to the middle shell to be opened.

Further, the three-folding bed frame comprises a first folding bed frame, a second folding bed frame and a third folding bed frame; two sides of the first folding bed frame are hinged to one side of the second folding bed frame and one side of the third folding bed frame respectively; and the second folding bed frame and the third folding bed frame may be sequentially folded and placed on the first folding bed frame when folded.

Further, a low hinge is arranged between one side of the first folding bed frame and the second folding bed frame; a high hinge is arranged between the other side of the first folding bed frame and the third folding bed frame; a rotating shaft of the high hinge is higher than that of the low hinge; and when the three-folding bed frame is folded and stored, the second folding bed frame is firstly arranged above the first folding bed frame in a covering mode, and the third folding bed frame may be arranged above the second folding bed frame in a covering mode.

Further, each of the second folding bed frame and the third folding bed frame comprises a punched bed board; the punched bed board comprises an upper punched bed board and a lower punched bed board; each of the upper punched bed board and the lower punched bed board is provided with uniform circular holes; and the upper punched bed board and the lower punched bed board are installed on an upper side and a lower side of a main frame of the second folding bed frame or the third folding bed frame respectively.

Further, M-shaped angle irons are fixed to side frames on two sides of the first folding bed frame; V-shaped angle irons are arranged on corresponding side frames, connected with the first folding bed frame, of the second folding bed frame and the third folding bed frame; when the second folding bed frame and the third folding bed frame are unfolded relative to the first folding bed frame, convex parts of the V-shaped angle irons and concave parts of the M-shaped angle irons are positioned, attached and abutted; and the V-shaped angle irons and the M-shaped angle irons are configured for increasing the abutting strength of the third folding bed frame and the first folding bed frame.

Further, the tent main body further comprises: tent cloth, covering an outer surface of the inflatable support frame; rain cloth, arranged on an outer side of the tent cloth and having one side edge fixedly connected with the tent cloth; and a support rod, having one end fixedly connected with the three-folding bed frame and the other end detachably and fixedly connected with the rain cloth, and configured for supporting the rain cloth outwards.

Further, the top of the inflatable support frame is of a slope top structure; and the slope top structure prevents water from accumulating on the top surface of the tent upon rainfall.

Further, the tent further comprises an extension ladder; when the three-folding bed frame is folded, the extension ladder may be placed above the third-folding bed frame and placed in the storage device after being retracted; and when the three-folding bed frame is unfolded, one end of the extension ladder is grounded after being extended, and the other end of the extension ladder is fixedly installed on the other side of the third-folding bed frame.

Further, an entrance is formed in one side surface of the tent cloth, and configured for personnel to get in and out.

Further, the inflatable support frame is further provided with an air nozzle; and the air nozzle is an inflation inlet configured for inflating the inflatable support frame.

Analysis shows that the present invention discloses a three-folding inflatable car roof tent and a storage device thereof. The car roof tent is provided with the size-adjustable tent storage device that may store the three-folding bed frame and the tent, may protect from rain, and is convenient to carry. When the tent is set up, the storage device may be reduced in size, thereby reducing space occupied by a roof, and improving safety. The tent storage device and the three-folding bed frame are slidably connected by the slide rails, thereby making storage more convenient. In terms of storage, the folded size is close to the size of a large suitcase. Detachable wheels are arranged at the bottom of the tent, thereby making the tent more convenient to carry. The technical scheme of the present invention lowers the difficulty of operation, greatly shortens replacement time and reduces work intensity, and saves costs.

BRIEF DESCRIPTION OF THE DRAWINGS

Description drawings forming a part of the application are configured to provide further understanding of the present invention. Schematic embodiments of the present invention and their descriptions are configured to explain the present invention and do not constitute improper limitations of the present invention. In the drawings.

DESCRIPTION OF DRAWING SYMBOLS

1—tent main body; 2—composite slide rails; 3—three-folding bed frame; 4—shell; 5—extension ladder; 6—car luggage rack;
11—inflatable support frame; 12—tent cloth; 13—rain cloth; 14—support rod;
21—first slide ways; 22—second slide ways; 23—double-row roller wheels; 24—single-row roller wheels; 25—slide rail slide ways; 26—first connecting frames; 27—second connecting frames; 28—first side connecting frame; 29—second side connecting frame;
31—first folding bed frame; 32—second folding bed frame; 33—third folding bed frame; 34—low hinge; 35—high hinge; 32a—upper punched bed boards; 32b—lower punched bed boards;
41—middle shell; 42—front shell; 43—rear shell; 44—open bottom;
111—air nozzle; 121—entrance;
310—M-shaped angle irons; and 330—V-shaped angle irons.

DETAILED DESCRIPTION OF THE EMBODIMENTS

The present invention will be described in detail below with reference to drawings and in combination with embodiments. Various examples are provided by way of explanation of the present invention rather than limiting the present invention. In fact, it will be apparent to those skilled in the art that modifications and variations may be made in the present invention without departing from the scope or spirit of the present invention. For example, features illustrated or described as part of one embodiment may be used for another embodiment to produce one more embodiment. Therefore, it is expected that the present invention includes such modifications and variations within the scope of appended claims and their equivalents.

In description of the present invention, orientations or positional relationships indicated by terms "longitudinal", "transverse", "upper", "lower", "front", "rear", "left", "right", "vertical", "horizontal", "top" and "bottom" are shown in the drawings, are only for the convenience of describing the present invention rather than requiring the present invention to be constructed and operated in a specific orientation, and therefore may not be understood as limitations of the present invention. Terms "connected", "connection" and "arranged" used in the present invention should be understood in a broad sense. For example, the connection may be a fixed connection or a detachable connection; the connected may be directly connected or indirectly connected through an intermediate component; and the connection may be a wired electrical connection, a radio connection, or a wireless communication signal connection. For those of ordinary skill in the art, specific meanings of the terms may be understood according to specific circumstances.

One or more examples of the present invention are shown in the drawings. Numerical and letter symbols are used in detailed description to refer to features in the drawings. Similar or analogous symbols in the drawings and description have been used to refer to similar or analogous parts of the present invention. As used herein, terms "first" "second" and "third" are used interchangeably to distinguish one component from another, and are not intended to denote the position or importance of the individual component.

As shown in FIGS. 1 to 11, according to embodiments of the present invention, a three-folding inflatable car roof tent and a storage device thereof are provided. The tent and the storage device are included. The tent may be placed in the storage device after being folded. The tent comprises a tent main body 1, two rows of composite slide rails 2 and a three-folding bed frame 3; the three-folding bed frame 3 is arranged above the composite slide rail 2 and fixedly connected to the two rows of composite slide rails 2; and the three-folding bed frame 3 above the two rows of composite slide rails 2 may be detachably and fixedly connected with a car luggage rack 6 correspondingly. The storage device comprises a shell 4; an open bottom is formed in a lower portion of the shell 4; the interior of the shell is of a hollow structure; and the shell 4 comprises a front shell 42, a middle shell 41 and a rear shell 43.

Figure 5:
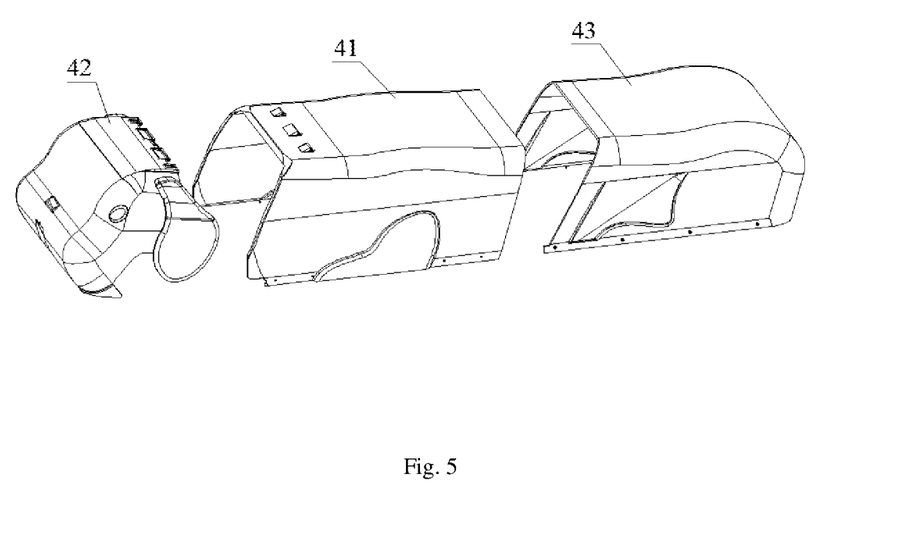
FIG. 5 is a structure decomposition schematic diagram of the shell.
Figure 6:
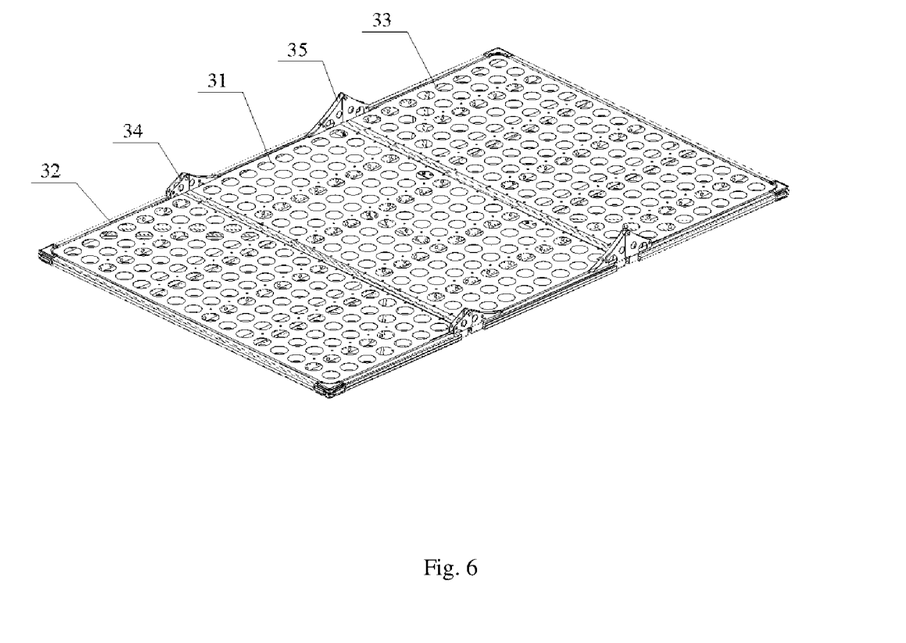
FIG. 6 is an unfolded state structure schematic diagram of the three-folding bed frame.

The three-folding bed frame 3 comprises a first folding bed frame 31, a second folding bed frame 32 and a third folding bed frame 33; two sides of the first folding bed frame 31 are hinged to one side of the second folding bed frame 32 and one side of the third folding bed frame 33 respectively; the second folding bed frame 32 and the third folding bed frame 33 may be folded and placed on the first folding bed frame 31 in sequence when folded; a low hinge 34 is arranged between one side of the first folding bed frame 31 and the second folding bed frame; the third folding bed frame 33 is hinged on the other side of the first folding bed frame 31; a high hinge 35 is arranged between the first folding bed frame 31 and the third folding bed frame 33; a rotating shaft of the high hinge 35 is higher than that of the low hinge 34; and when the three-folding bed frame 3 is folded, the second folding bed frame 32 is arranged above the first folding bed frame 31 in a covering mode, and the third folding bed frame 33 is arranged above the second folding bed frame 32 in a covering mode. The three-folding bed frame 3 is folded to reduce the transverse size of storage, so that the bed frame as a whole may be conveniently placed in the storage device; when the tent is set up, the storage device may be reduced in size, thereby reducing space occupied by a roof, and improving safety; the tent storage device and the three-folding bed frame are slidably connected by the slide rails, thereby making storage more convenient; in terms of storage, the folded size is close to the size of a large suitcase; and detachable wheels are arranged at the bottom of the tent, thereby making the tent more convenient to carry. The front shell 42 may be turned relative to the rear shell 43; the overall size of the rear shell 43 is smaller than the size of the middle shell 41, so that the rear shell 43 may be sleeved in the middle shell 41; and the storage device 4 may be extended and retracted between the middle shell 41 and the rear shell 43 to adjust the volume of the storage device. Relative sliding of the middle shell 41 and the rear shell 43 is realized by relative sliding of the composite slide rails 2; and when the three-folding bed frame 3 needs to be stored, the front shell 42 is turned outwards to be opened, and the middle shell 41 and the rear shell 43 of the storage device 4 slide towards the three-folding bed frame 3 until the three-folding bed frame 3 is completely accommodated in the storage device 4.

Figure 3:
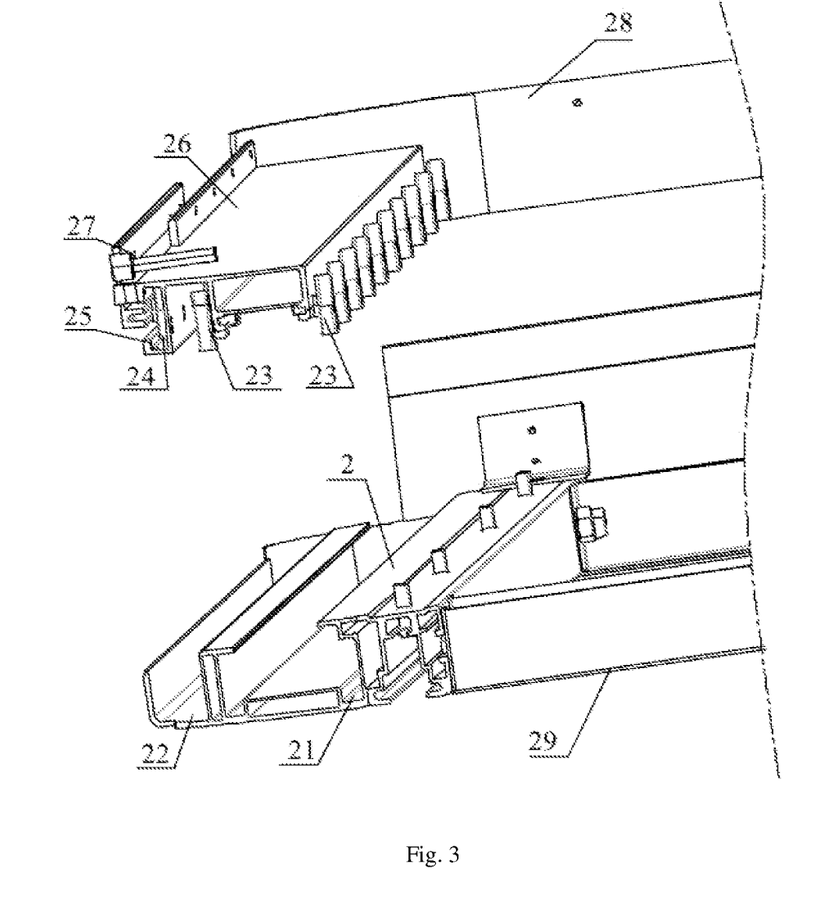
FIG. 3 is a splitting and connection structure schematic diagram of the composite slide rails.

The two rows of composite slide rails 2 are arranged; each of the two rows of composite slide rails 2 comprises a first connecting frame 26; each row of the composite slide rails 2 comprises first slide ways 21 and a second slide way 22; when the three-folding bed frame 3 is in a folded state, the two first slide ways 21 are arranged on the composite slide rails 2 on two sides of a lower portion of the three-folding bed frame 3 respectively; the two second slide ways 22 are arranged on the outer sides of the corresponding first slide way 21 and fixedly connected with the corresponding first slide way 21; and a second side connecting frame 29 is arranged between the two first slide ways 21, and configured for fixing and positioning the two first slide ways 21.

Figure 4:
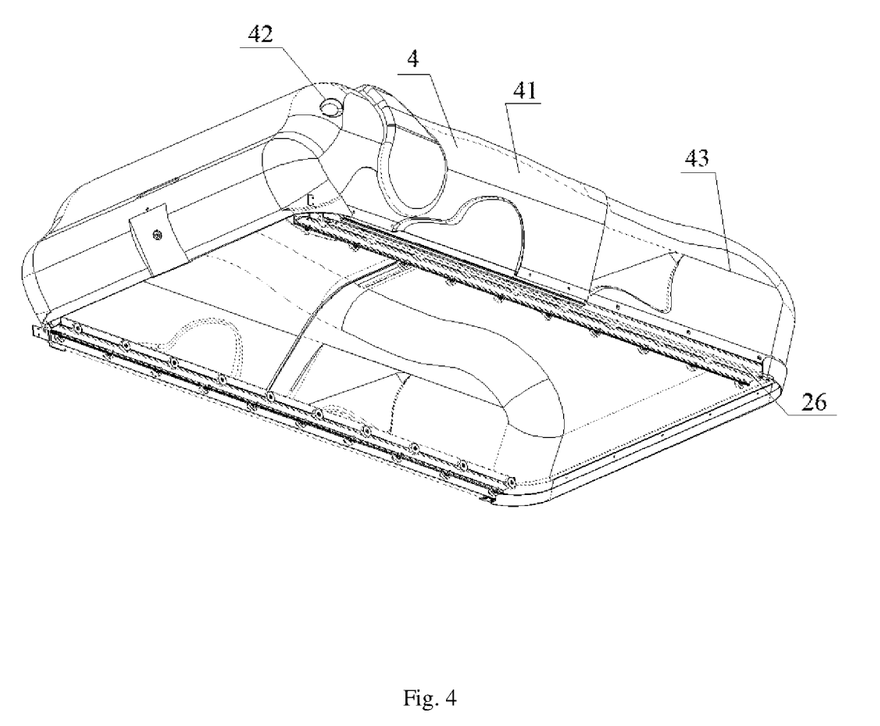
FIG. 4 is a connection structure schematic diagram of a shell, first connecting frames and double-row roller wheels.

Two first connecting frames 26 are respectively connected to two symmetric bottom sides of the shell 4; double-row roller wheels 23 are fixedly connected with the first connecting frames 26; the two first connecting frames 26 are both fixedly connected to the rear shell 43; and two rows of double-row roller wheels 23 are both arranged in the corresponding first slide ways 21 and are slidable relative to the corresponding first slide ways 21. Each of the first connecting frames 26 further comprises a slide rail slide way 25; and a slide rail of the slide rail slide way 25 is arranged in the corresponding second slide way and is slidable relative to the corresponding second slide way. A first side connecting frame 28 is arranged between the two first connecting frames 26, and configured for positioning and fixing the two first connecting frames 26.

Two single-row roller wheels 24 are arranged in slide ways of the corresponding slide rail slide ways 25; each single-row roller wheel 24 may slide relative to the corresponding slide rail slide way 25; each second connecting frame 27 is fixedly connected with the corresponding single-row roller wheel 24; the two second connecting frames 27 are fixedly connected with the middle shell 41; the two first connecting frames 26 are fixedly connected with the rear shell 43; the rear shell 43 is sleeved in the middle shell 41 through slide-in of the composite slide rails 2; one side edge of the front shell 42 is in hinged connection with the outer edge of the middle shell 41; the front shell 42 may be turned outwards and upwards relative to the middle shell 41 to be opened; and a specific shape of the front shell 42 is set as a head shape of a golden retriever.

The two second connecting frames 27 are fixedly connected with the middle shell 41; when the double-row roller wheels 23 are slid, the first connecting frames 26 drive the rear shell 43 to slide relative to the three-folding bed frame 3; and when the single-row roller wheels 24 are slid, the second connecting frames 27 drive the middle shell 41 to slide relative to the first connecting frames 26.

Figure 7:
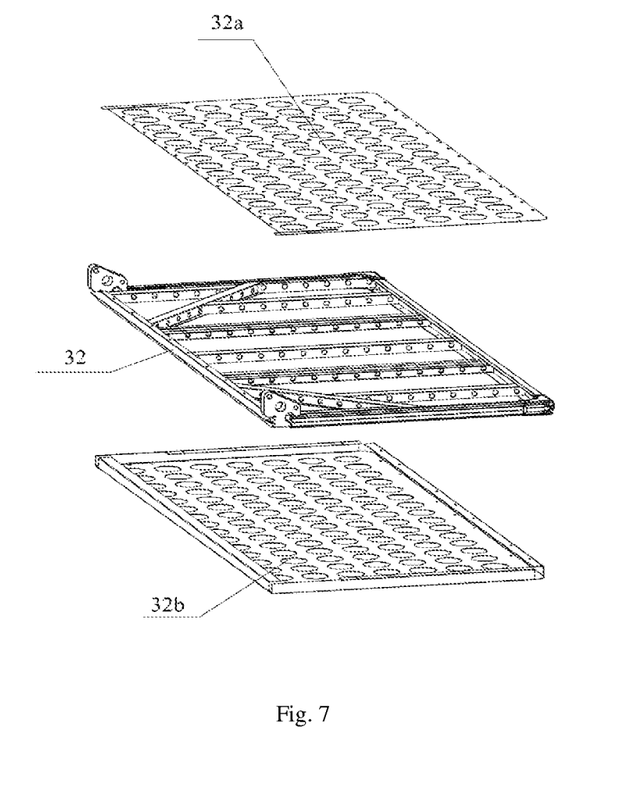
FIG. 7 is a structure schematic diagram of upper punched bed boards and lower punched bed boards of a first folding bed frame, a second folding bed frame or a third folding bed frame.

Each of the first folding bed frame 31, the second folding bed frame 32, and the third folding bed frame 33 comprises a punched bed board; as shown in FIG. 7, an upper punched bed board 32a and a lower punched bed board 32b are installed on an upper side and a lower side of each of the first folding bed frame 31, the second folding bed frame 32 and the third folding bed frame 33 respectively; the upper punched bed board 32a is provided with uniform circular holes; the lower punched bed board 32b is provided with uniform circular holes in the second folding bed frame 32 and the third folding bed frame 33; and the uniform circular holes reduce the overall weight while ensuring the hardness of the bed board. The edges of the lower punched bed boards 32b are provided with sheet metal bends; the lower punched bed boards 32b are fixedly connected with the upper punched bed boards 32a by screws; and each of the first folding bed frame 31, the second folding bed frame 32 and the third folding bed frame 33 forms a regular square.

Preferably, the composite slide rails 2 are in the form of a combination of the double-row roller wheels 23 and the single-row roller wheels 24 with the first connecting frames and the second connecting frames of an aluminum profile frame; and a plurality of roller wheels are installed on the aluminum profile frame to form the composite slide rails 2; and the composite slide rails 2 have high hardness and are more durable. The double-row roller wheels and the single-row roller wheels are installed in side frames of the composite slide rails 2, thereby avoiding damage caused by collision of the composite slide rails 2, and prolonging the service life of the tent as a whole.

Figure 8:
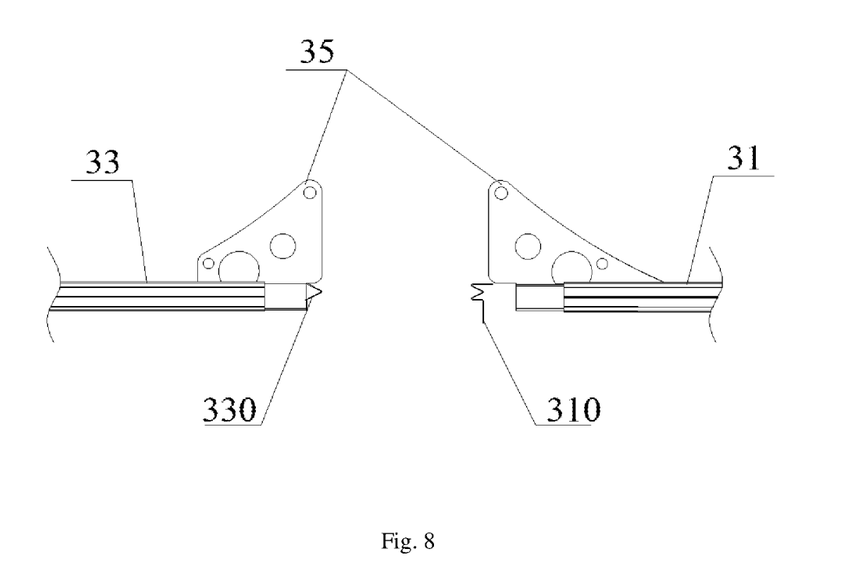
FIG. 8 is a connection relationship structure schematic diagram of a low hinge or a high hinge.
Figure 9:
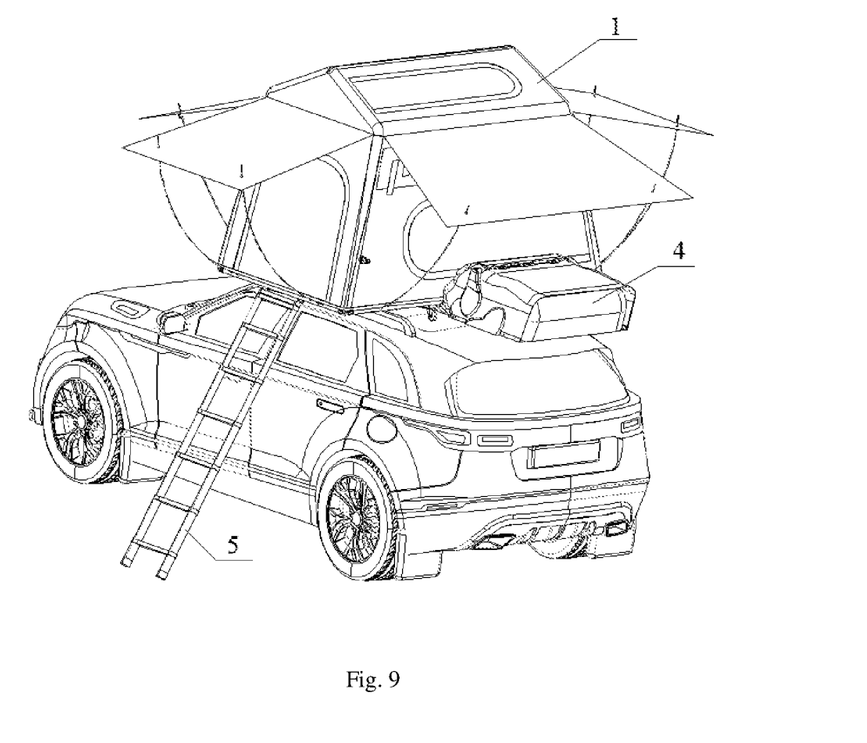
FIG. 9 is a state diagram of the three-folding inflatable car roof tent and the storage device thereof installed on a car roof.

As shown in FIG. 8, M-shaped angle irons 310 are fixed to side frames on two sides of the first folding bed frame 31; installation shells 311 are fixedly installed on downward extension parts of the M-shaped angle irons 310; and the side edges of the first folding bed frame 31 of the three-folding bed frame 3 below the composite slide rails 2 are fixedly connected through the installation shells 311 and the M-shaped angle irons 310, so as to realize a sliding connection between the storage device 4 and the first folding bed frame 31. V-shaped angle irons are arranged on the ends, hinged to the first folding bed frame 31, of the second folding bed frame 32 and the third folding bed frame 33; and when the second folding bed frame 32 and the third folding bed frame 33 are unfolded in parallel relative to the first folding bed frame 31, convex parts of the V-shaped angle irons 330 and concave parts of the M-shaped angle irons 310 are attached and abutted for increasing the abutting strength of the third folding bed frame 33 and the first folding bed frame 31, thereby making the unfolded three-folding bed frame 3 more stable in structure.

The composite slide rails 2 as a whole are of a square frame structure; a storage bottom plate is arranged in front of the composite slide rails 2; a locking device is arranged in the middle of the upper edge of the storage bottom plate; a cam lock is installed at the position, corresponding to the locking device, of the front shell 42 of the storage device 4; and when the three-folding inflatable tent is stored in the storage device 4, the cam lock is rotated to lock the front shell 42 and the storage bottom plate so as to prevent the storage device 4 and the composite slide rails 2 from moving relatively in a storage state.

Figure 10:
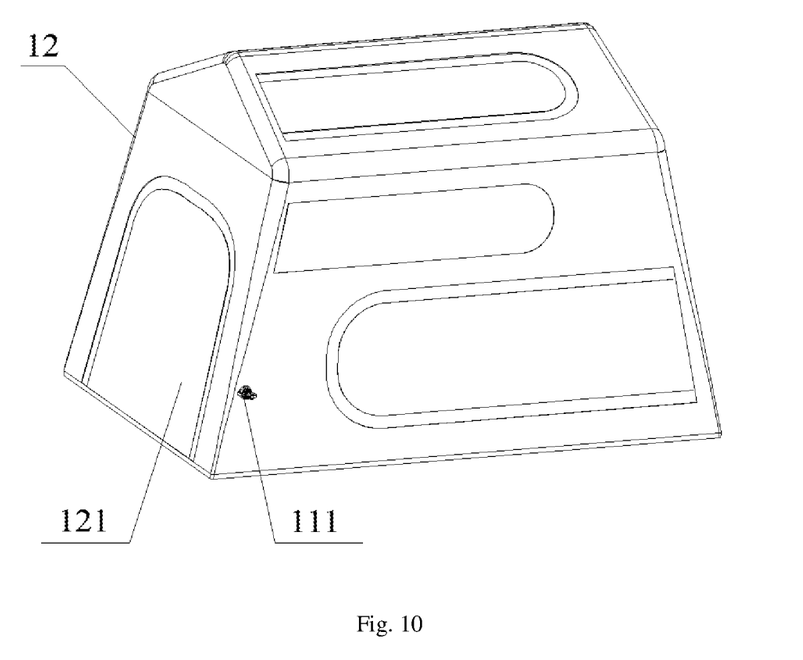
FIG. 10 is a structure schematic diagram of tent cloth.
Figure 11:
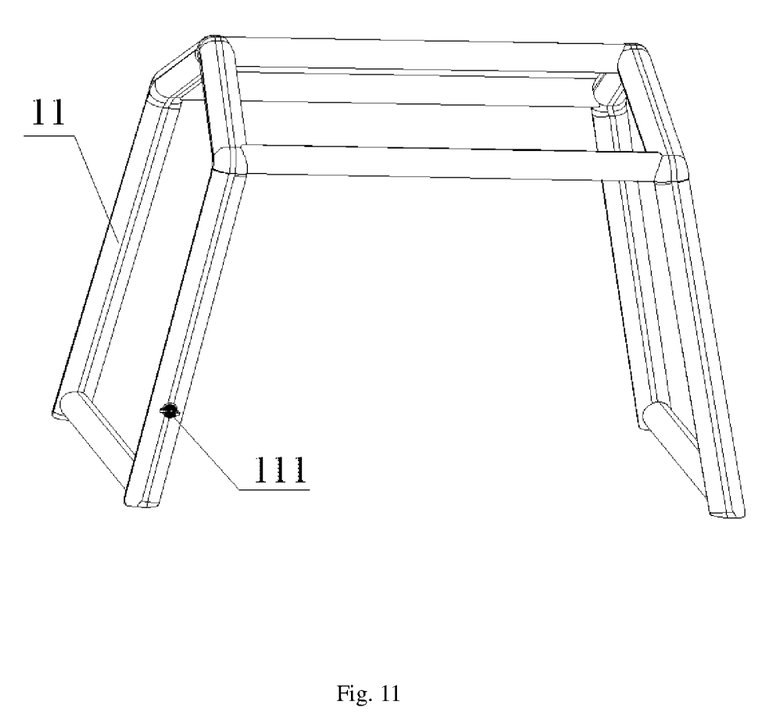
FIG. 11 is a structure schematic diagram of an inflatable support frame in an inflation state.

The tent main body 1 comprises an inflatable support frame 11; the inflatable support frame 11 is inflated to form a tent frame; the outside of the inflatable support frame 11 is covered with tent cloth 12; the tent cloth 12 is connected to all the surfaces of the inflatable support frame 11; when the tent needs to be stored, air in the inflatable support frame 11 is pumped out from an air nozzle 111 by an air pump; and the top of the inflatable support frame 11 is of a slope top structure, thereby effectively preventing water from accumulating upon rainfall. A side edge of the tent cloth 12 is provided with an entrance 121; and the top and the side surfaces of the tent cloth 12 are further provided with skylights and side windows respectively. The periphery of the tent cloth 12 is provided with rain cloth 13 that may be supported outwards; one end of the rain cloth 13 is fixedly connected with the tent cloth 12, and the other end of the rain cloth 13 is detachably provided with a support rod 14; and one end of the support rod 14 is connected with the corner of the rain cloth 13, and the other end of the support rod 14 is fixedly connected with the three-folding bed frame 3, and inserted into an aluminum profile hole of the bed frame to support the rain cloth 13 outwards, so as to protect from rain and sun.

Figure 1:
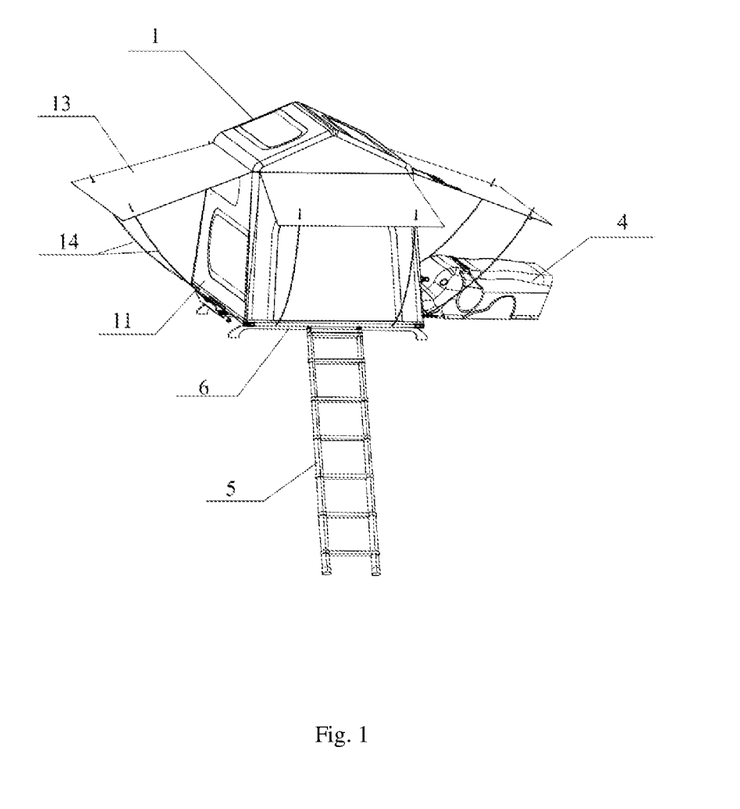
FIG. 1 is an unfolded structure schematic diagram of a three-folding inflatable car roof tent and a storage device thereof.
Figure 2:
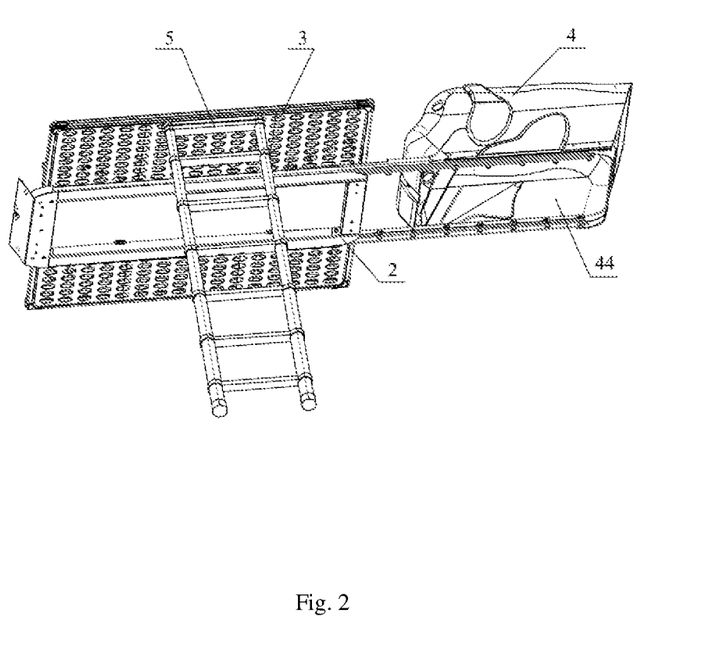
FIG. 2 is a connection structure schematic diagram of composite slide rails, a three-folding bed frame and a storage device.

An extension ladder 5 is also detachably connected to one side of the third folding bed frame 33 of the three-folding bed frame 3; one end of the extension ladder 5 is hinged to a frame body of the third folding bed frame 33; when the three-folding bed frame 3 is folded, the extension ladder 5 is folded on the back side of the third folding bed frame 33; and when in use, one end of the extension ladder 5 is grounded, and the other end of the extension ladder 5 is installed on the back surface of the third folding bed frame 33. According to a specific use method of the present invention, the device is placed on the luggage rack at the roof; the cam lock on the front shell 42 is rotated with a key; the front shell 42 is turned upwards; the storage device 4 is slid backwards after turning; the middle shell 41 and the rear shell 43 are overlapped; at the moment, the three-folding inflatable tent is totally exposed; the third folding bed frame 33 and the second folding bed frame 32 of the three-folding bed frame 3 are unfolded to be horizontal; the extension ladder 5 is stretched to be grounded; the air pump is connected with the air nozzle 111 on the inflatable support frame and performs inflation until the tent is set up; the rain cloth 13 of the tent is supported outwards and fixed with the support rod 14; and at the moment, the tent may be used. When the tent needs to be stored, the air in the inflatable support frame 11 is pumped out from the air nozzle 111 by the air pump firstly, the three-folding bed frame 3 is folded after deflation is completed, and then the storage device 4 is slid forward to store the tent and is locked.

From the above description, it may be seen that the above-mentioned embodiments of the present invention achieve the following technical effects:

1. The three-folding inflatable tent is provided with the size-adjustable tent storage device that may store the three-folding bed frame and the tent, may protect from rain, and is convenient to carry. When the tent is set up, the storage device may be reduced in size, thereby reducing space occupied by the roof, and improving safety.
2. The tent storage device and the three-folding bed frame are slidably connected by the slide rails, thereby making storage more convenient.
3. In terms of storage, the folded size is close to the size of the large suitcase. The detachable wheels are arranged at the bottom of the tent, thereby making the tent more convenient to transport.

Compared with the prior art, the three-folding inflatable tent is relatively light in weight of an inflatable structure and firmer in structure. As a whole, the storage device is slidably connected to the three-folding bed frame, thereby making storage convenient. The storage device also may be folded and stored to reduce occupied area when not in use. In addition, the three-folding inflatable tent is simple to open and high in set-up speed, and not only improves user experience, but also has relatively high safety.

The above descriptions are only preferred embodiments of the present invention, and are not used to limit the present invention. For those skilled in the art, the present invention may have various modifications and variations. Any modification, equivalent replacement, improvement, etc. made within the spirit and principle of the present invention shall be included within the protection scope of the present invention.

The invention claimed is:

1. A three-folding inflatable car roof tent and a storage device thereof, comprising the tent and the storage device; the tent is capable of being stored in the storage device;
   the storage device comprises:
   a shell, wherein an open bottom is formed in a lower portion of the shell, and the interior of the shell is of a hollow structure; and
   two rows of composite slide rails, wherein each of the two rows of composite slide rails comprises a first connecting frame, and two first connecting frames are respectively connected to two symmetric bottom sides of the shell; and
   wherein the tent comprises a tent main body and an inflatable support frame, and further comprises:
   a three-folding bed frame, fixedly connected with the upper portions of side frames of the composite slide rails, and being capable of sliding into the hollow shell through the composite slide rails; and
   wherein each row of the composite slide rails comprises:
   first slide ways, respectively arranged on two sides of a lower portion of the three-folding bed frame;
   a second slide way, arranged on an outer side of the corresponding first slide way and fixedly connected with the corresponding first slide way;

double-row roller wheels, fixedly connected with a first connecting frame, arranged in the first slide ways and being capable of sliding relative to the corresponding first slide ways, wherein each of the first connecting frames further comprises a slide rail slide way, and a slide rail of the slide rail slide way is arranged in the second slide way and is slidably relative to the corresponding second slide way;

single-row roller wheels, arranged in a slide way of the slide rail slide way, and being capable of sliding relative to the slide rail slide way; and a second connecting frame, fixedly connected with the single-row roller wheels.

2. The three-folding inflatable car roof tent and the storage device thereof according to claim 1, wherein a shell comprises:

a middle shell, fixedly connected with two second connecting frames;

a rear shell, fixedly connected with two first connecting frames, and being capable of being sleeved with the middle shell through slide-in of the composite slide rails; and a front shell, having one side edge hinged to an outer edge of the middle shell, and being capable of being turned outwards and upwards relative to the middle shell to be opened.

3. The three-folding inflatable car roof tent and the storage device thereof according to claim 2, wherein the three-folding bed frame comprises a first folding bed frame, a second folding bed frame and a third folding bed frame; two sides of the first folding bed frame are hinged to one side of the second folding bed frame and one side of the third folding bed frame respectively; and the second folding bed frame and the third folding bed frame may be sequentially folded and placed on the first folding bed frame when folded.

4. The three-folding inflatable car roof tent and the storage device thereof according to claim 3, wherein a low hinge is arranged between one side of the first folding bed frame and the second folding bed frame; a high hinge is arranged between the other side of the first folding bed frame and the third folding bed frame; a rotating shaft of the high hinge is higher than that of the low hinge; and when the three-folding bed frame is folded and stored, the second folding bed frame is firstly arranged above the first folding bed frame in a covering mode, and the third folding bed frame may be arranged above the second folding bed frame in a covering mode.

5. The three-folding inflatable car roof tent and the storage device thereof according to claim 4, wherein each of the second folding bed frame and the third folding bed frame comprises a punched bed board; the punched bed board comprises an upper punched bed board and a lower punched bed board; each of the upper punched bed board and the lower punched bed board is provided with uniform circular holes; and the upper punched bed board and the lower punched bed board are installed on an upper side and a lower side of a main frame of the second folding bed frame or the third folding bed frame respectively.

6. The three-folding inflatable car roof tent and the storage device thereof according to claim 3, wherein M-shaped angle irons are fixed to side frames on two sides of the first folding bed frame; V-shaped angle irons are arranged on corresponding side frames, connected with the first folding bed frame, of the second folding bed frame and the third folding bed frame; when the second folding bed frame and the third folding bed frame are unfolded relative to the first folding bed frame, convex parts of the V-shaped angle irons and concave parts of the M-shaped angle irons are positioned, attached and abutted; and the V-shaped angle irons and the M-shaped angle irons are configured for increasing the abutting strength of the third folding bed frame and the first folding bed frame.

7. The three-folding inflatable car roof tent and the storage device thereof according to claim 3, wherein the tent further comprises an extension ladder; when the three-folding bed frame is folded, the extension ladder may be placed above the third-folding bed frame and placed in the storage device after being retracted; and when the three-folding bed frame is unfolded, one end of the extension ladder is grounded after being extended, and the other end of the extension ladder is fixedly installed on the other side of the third-folding bed frame.

8. The three-folding inflatable car roof tent and the storage device thereof according to claim 1, wherein the tent main body further comprises:

tent cloth, covering an outer surface of the inflatable support frame;

rain cloth, arranged on an outer side of the tent cloth and having one side edge fixedly connected with the tent cloth; and a support rod, having one end fixedly connected with the three-folding bed frame and the other end detachably and fixedly connected with the rain cloth, and configured for supporting the rain cloth outwards.

9. The three-folding inflatable car roof tent and the storage device thereof according to claim 8, wherein the top of an inflatable support frame is of a slope top structure; and the slope top structure prevents water from accumulating on the top surface of the tent upon rainfall.

10. The three-folding inflatable car roof tent and the storage device thereof according to claim 8, wherein an entrance is formed in one side surface of the tent cloth, and configured for personnel to get in and out.

11. The three-folding inflatable car roof tent and the storage device thereof according to claim 1, wherein the inflatable support frame is further provided with an air nozzle; and the air nozzle is an inflation inlet configured for inflating the inflatable support frame.

* * * * *